June 9, 1942.    C. D. QUINN,    2,286,105
SANITARY PIPE COUPLING
Filed April 17, 1940
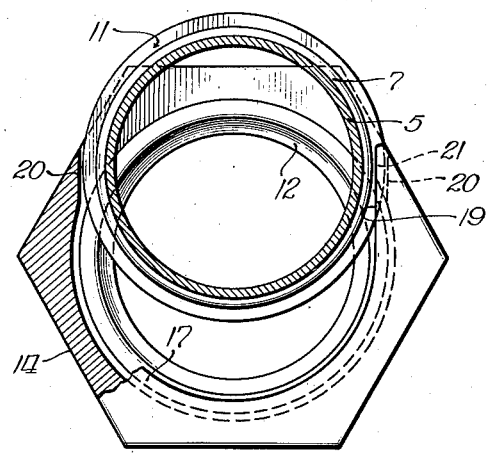
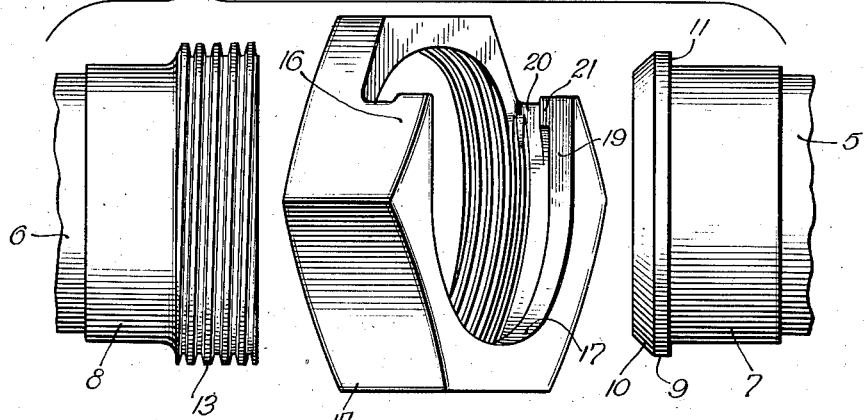
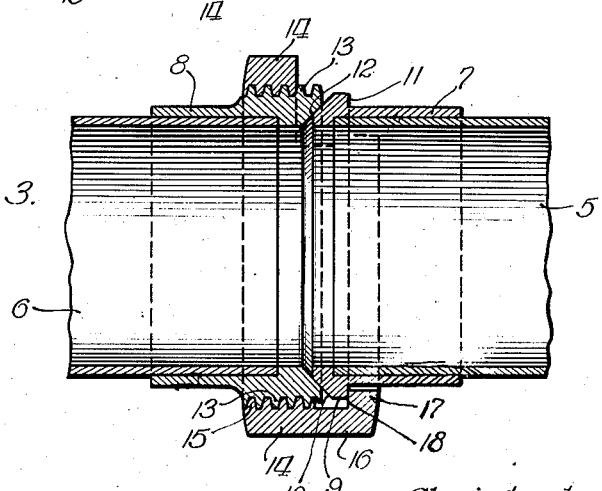
INVENTOR.
Christopher D. Quinn
BY
ATTORNEY.

Patented June 9, 1942

2,286,105

UNITED STATES PATENT OFFICE 2,286,105

SANITARY PIPE COUPLING

Christopher D. Quinn, New York, N. Y., assignor to Cherry-Burrel Corporation, Chicago, Ill., a corporation Application April 17, 1940, Serial No. 330,013

1 Claim. (Cl. 285—143)

This invention relates to improvements in easily assembled and disassembled pipe couplings. More particularly the invention relates to separable and connectible couplings for separably joining the ends of pipe sections in a readily and quickly connectible and separable manner.

Although the invention is readily applicable to various types of couplings other than pipe couplings, it is particularly well adapted for use in connecting the ends of sanitary pipe sections, such as are commonly used in the handling of foodstuffs, in which use the pipe sections must be frequently uncoupled, cleaned and re-coupled.

In the processing of foodstuffs it is conventional practice to frequently clean the apparatus used in the handling of the product, including the sanitary piping, couplings and fittings. Obviously much time is consumed incidental to such dismantling or disassembling and re-assembly operations. Frequently it is also difficult to separate and re-couple certain pipe sections in a processing plant due to the lack of sufficient clearance between the abutting ends of pipe sections to permit the ready removal, re-insertion and adjustment of coupling elements or sections.

A very common and, it may be said, conventional arrangement or assembly of elements comprising parts of a pipe system is a length of pipe provided at its ends with collars or ferrules adapted to sealingly engage complementary elements on the ends of abutting pipe sections. Such sealing engagement is normally secured and maintained by the use of flanged and internally threaded coupling elements or coupling nuts telescoped onto the respective pipe sections from which they cannot be removed. These coupling elements are adapted to overlappingly engage the ferruled ends of one of the abutting pipe sections and engage screw threads on the ferrule of the other abutting pipe section.

Obviously such an arrangement presents difficult problems in connection with the cleaning of the inner surfaces of the coupling elements or nuts which normally cannot be removed from the pipe section onto which they were telescoped before the enlarged ferrules were secured to the ends thereof. The difficulty experienced in the cleaning of the interior of such coupling elements is especially serious when the pipe sections are very short and the possible movement of the accompanying elements away from the enlarged ferrules on the ends of the pipes is limited, thereby preventing easy access to the inside of the coupling elements.

Unless the coupling nut or element is of the multi-sectional type, of which there are some on the market, it cannot be removed laterally or placed onto the abutting ends of pipe sections from a lateral position. A coupling element which can be positioned onto the pipe section after it is placed in assembled position and after it has been provided with ferruled ends solves various of the difficult problems in the arrangement and assembly of piping. The multi-sectioned laterally removable coupling elements of the conventional type, however, are normally comprised of a plurality of sectional parts resulting in a weakened structure as well as a more costly construction.

In the assembly of a section of pipe provided with enlarged ferrules at its ends which are normally sweated thereonto, together with coupling elements or nuts telescoped over the pipe between the ferrules, it is normally a cumbersome procedure to fix the collars of ferrules to the ends of the pipes due to the interference from the easily sliding coupling nuts. However, in the conventional assembly of a pipe section the coupling elements must be telescoped over the pipe section before the enlarged ferrule is assembled thereonto for the very obvious reason that normally the coupling nut is provided with a restricting flange which will not pass over the shoulder on the coupling ferrule.

In the laterally removable coupling elements of the conventional type the resulting coupling is normally weakened and usually more complicated and more difficult to apply for the reason that it normally is comprised of a plurality of sectional elements, all of which must be assembled onto the ends of the abutting pipe sections. Those coupling elements of conventional design which are laterally removable normally are not readily maintainable upon elements of the pipe sections to be coupled together before the coupling operation is started by threading one element onto the other. In other words, the coupling elements of the laterally removable type must normally be held in position by the operator until the coupling elements are at least joined.

It is also quite obvious that, in an assembly of pipe sections provided with the conventional type of coupling nut, it is not normally possible to substitute for the conventional coupling nut a modified coupling element which is laterally removable over the pipe sections, which is interchangeable with the conventional coupling nut and which, after being placed in coupled position, is applied to the pipe sections in substantially the same manner as the conventional coupling nut.

In the sanitary coupling element as illustrated the female element is provided with a beveled seat on its inner surface, and is provided with coupling nut engaging threads on its outer surface which extend through the extreme forward end of the female coupling element. This construction enables the compact and structurally superior construction of a coupling in which the threads of the coupling nut and the threads of the outer surface of the female element are in supporting engagement as close to the retaining flange of the coupling nut which engages the male element as possible. Obviously, by providing the outer surface of the female element with the nut engaging threads immediately adjacent the end of the female element, it is possible to use a narrower nut and yet maintain a predetermined distance of engagement between the threads of the coupling nut and the threads on the outer surface of the female element than would be possible if the nut engaging threads were provided on the outer surface of a male element of a coupling of the type disclosed in this invention.

The prime objects and advantages of the present invention are, therefore, to provide a coupling for pipe sections and the like which enables the easy assembly of pipe sections in close quarters; which may be easily removed from the pipe sections to permit inspection and cleaning; in which the fabrication of the ferruled pipe sections is facilitated by eliminating the necessity of placing coupling elements on the pipe sections before the ferrules are sweated thereonto; in which the coupling element is laterally removable and yet comprises a unitary construction of substantially the same strength as the conventional coupling element; in which the coupling element may be applied and tightened as readily and in substantially the same manner as the conventional coupling nut and used interchangeably therewith; in which the cooperative coupling elements and the coupling nut are so constructed as to provide a compact and structurally advantageous and superior coupling less costly to produce; and in which the laterally removable coupling element is provided with necessary structural features so as to hang on the end of a pipe section after being positioned thereon preparatory to coupling the ends of the adjacent pipe sections together.

These and other objects and advantages of the present invention, which will become more apparent as the invention is better understood, are preferably accomplished as illustrated in the preferred embodiment of the invention in a sanitary pipe coupling. The organization and method of operation will best be understood from the following description of the specific embodiment when read in connection with the accompanying drawing in which:

Figure 1 is a transverse elevational sectional view of a ferruled end of a pipe section partially inserted into a coupling element which is shown in partially broken away sectional end elevation.

Figure 2 is an elevational view of the parts of the improved coupling in relative order of assembly showing the improved coupling nut in perspective.

Figure 3 is a longitudinal section taken through an assembled coupling of the preferred embodiment of the invention.

Referring to the figures, in which like numerals are used to identify like parts, 5 represents the end of a pipe section to be coupled in sealed communication with the adjacent end 6 of an adjacent pipe section. The ends 5 and 6 of the adjacent pipe section are provided with ferrules or collars 7 and 8, respectively. The ferrule 7 is provided at its free end with an outer peripheral flange 9 having an outwardly beveled front face 10 and a perpendicular laterally extending rear face 11. The beveled face 10, when the various elements of the coupling are assembled, is adapted to sealingly engage a complementary inwardly beveled face 12 in the adjacent end of the ferrule 8 which is provided on its outer periphery with screw threads 13.

These screw threads 13 extend to the outer end of the ferrule 8 and overlap the inwardly beveled face or seat 12, thereby enabling the engagement of the complementary screw threads in the coupling nut as close as possible to the compression flange of the nut, resulting in a more compact and structurally superior combination of elements in which a predetermined amount of engagement between the threads of the coupling nut and the threads on the outer surface of the coupling element is obtainable. This is readily distinguishable from a construction in which the screw threads 13 do not extend to the end of the coupling element, thereby necessitating a broader nut to secure the same amount of threaded engagement between the coupling nut and the coupling element.

To secure and maintain the beveled sealing and centering faces 10 and 12 in sealing engagement and to prevent any relative lateral motion of the ends 5 and 6 of the pipe sections, a coupling nut or element 14 having internal screw threads 15 complementary to screw threads 13 is secured onto the threaded end of the ferrule 8. The coupling nut or element 14 is provided on its face adjacent the ferrule 7 with a partial skirt 16 or a longitudinally extending segment of an annular flange which is provided at its free end with an arcuate flange or internal segment of an annular rib 17 having an inner face 18 perpendicular to the axis of the nut 14. The inner face 18 of the segment rib 17 is adapted to engage the rear face 11 of the flange 9 on the collar or ferrule 7 which is overlapped by the skirt or longitudinally extending flange 16 of the coupling nut 14. By this arrangement it is possible to draw the beveled sealing and centering faces 10 and 11 into sealing and centering engagement by tightening the nut 14 upon the threaded ferrule 8.

In the conventional coupling nut the skirt or flange comparable to the skirt or flange 16 of the improved coupling nut is, of course, of a continuous annular construction. The inwardly extending rib of the conventional coupling nut which is comparable to the segmental annular rib 17 which has an internal diameter less than the outer diameter of the flange 9 on the ferrule 7 is also of continuous annular construction.

As previously commented, in the assembly of pipe sections the coupling element or nut is telescoped over the pipe sections and the flanged ferrules are then sweated or otherwise secured onto the ends of the sections, thereby locking the coupling nut or nuts onto the pipe sections. Such procedure presents difficulties in the operation of sweating the ferrules onto the ends of the pipe due to the fact that the coupling elements or nuts which are free to move on the pipe section obstruct the free and easy manipulation of the pipe section in the process of sweating the ferrules thereonto.

It is, of course, also obvious that the coupling nuts, when unremovably locked on the pipe section, become very difficult to clean, especially the inner surface of the coupling nuts. The improved coupling nut included in the instant invention obviates these difficulties, as well as other difficulties referred to in the introduction to the specification, and incorporates the various advantages referred to in the objects. To form such an improved coupling element or nut a standard coupling nut, provided interiorly with screw threads and exteriorly with gripping faces and having longitudinally extending annular skirt provided internally with a restricting flange or rib and externally with gripping faces like unto the coupling nut, is cut away through the skirt 16 and inwardly directed rib 17 through approximately one-third of their normal circumference. The internally threaded coupling nut 14 remains intact. The ends of the inner periphery of the annular rib 17 are provided with parallel flat faces 19 substantially tangent to the inner circular periphery of the rim 17.

The essential element with respect to the spacing of the faces 19 is that they must be spaced apart a sufficient distance to permit the ready passage of the ferrule 7 therebetween. In like manner the major portion of the width of the inner peripheral surface of the skirt 16 is provided with opposed parallel flat faces 20, as shown in the drawing. In the drawings the faces 20 are shown as extensions of cords of a segment of the circle defined in part by the inner periphery of the skirt 16. However, the essential element with respect to the space between the parallel faces 20 is that they must be spaced apart a sufficient distance to permit the ready passage of the flange 9 therebetween. To enable the placing of a coupling nut or element onto the ferruled end of pipe 5 and the retention of the nut thereon in coupling position until it is coupled to the threaded ferrule on the end of pipe 6, the remaining portion 21 of the width of the inner peripheral surface of the ends of the skirt 16 is left intact thereby in effect providing oppositely disposed projections which are spaced closer together than the maximum outer diameter of flange 9 on ferrule 7.

Figure 2 also shows the end of the rearmost threads in the nut 14 cut away. However, this is not essential in that the width of the skirt 16 between the rearmost thread 15 of the coupling nut 14 and the inner face 18 of the rib 17 is wider than the flange 9 with its beveled front face 10.

To assemble the pipe coupling employing the improved coupling nut and the remaining aspects of the present invention, it is only necessary to place the ferruled ends of the pipe sections of the type illustrated in close juxtaposed position, leaving enough space therebetween to receive the coupling nut 14. The portion of the coupling nut 14 devoid of the skirt 16 is inserted between the adjacent ends of the pipe sections with the skirt 16 overlapping the flange 9, the rear face 11 of which is slidably engaging the inner front face 18 of the rib 17, as shown in Figure 1. The coupling nut 11 is moved into alinement with the pipe sections until the flange 9 rests in the curved portion of the skirt 16 at which time the threads 15 of the coupling nut 14 may be engaged with the threads 13 on the ferrule 8 on the remaining pipe sections. By tightening the nut 14 into the ferrule 8 the ends of the ferruled pipe sections will be brought into sealing and centering engagement with the complementary faces 10 and 12, maintaining the sections in centered relation to prevent any possible lateral motion thereof, as clearly illustrated in Figure 3.

If, after placing the coupling nut 14 on the end of pipe 5, as just described, but before the threads of nut 14 are engaged with the threads on the ferrule 8, it is desired to let the skirted coupling nut 14 hang on the end of pipe 5, it is only necessary to move the coupling nut 14 toward the left until face 11 of flange 9 engages face 18 of flange 17. Then, by lowering the nut 14 slightly, the opposed elements 21 of the ends of the inner surface of the skirt 16 which have not been cut away to provide the flat surfaces 20 will engage opposed points on the upper outer surface of the flange 9 to act as pivot points for supporting the nut 14 on the ferruled end of the pipe 5. The entire construction and relative dimensioning of the various elements of the ferrules, coupling nut, etc., are such that the nut 14 can pivot only slightly on the points 21 until the lower surface of ferrule 7 will engage the adjacent surface of flange 17 on the skirt 16 of the coupling nut 14 to thereby prevent the further tilting of the nut 14 until it would be in position to become disengaged from the ferruled end of the pipe 5.

It should, of course, also be remembered that the coupling nut 14 may be suspended or hung on the end of the pipe 5 by merely slipping the coupling nut back onto the pipe just as one would slide an over-sized ring onto the pipe to suspend it there. This is readily possible since the ferruled end of the pipe is placed in position on the coupling nut by a lateral insertion through the slotted side of the nut and the inner threaded portion of the nut is of a larger diameter than the outer periphery of the ferrule 9, thereby permitting the ready movement of the nut onto the pipe 5 for suspension until the operator is disposed to use it in coupling the ends of the pipes 5 and 6.

According to the previous description, the invention includes a novel coupling nut which, when placed in cooperation with the remaining elements of the sanitary pipe coupling, provides a coupling assemblage which is easy to assemble even in cramped quarters; which may be easily removed from the pipe sections for inspection and cleaning; which permits the easy assemblage of the ferrules on the sections of the pipe due to the fact that the easily slidable couping nuts do not need to be telescoped onto the ends of the pipe sections before the ferrules have been sweated thereonto; which may be laterally removed from the pipe sections while in coupled position; which is of a unitary construction and substantially the same strength as the conventional couping nut; which is interchangeable with the conventional coupling nut in a pipe coupling; in which the inter-cooperating elements are so arranged as to provide a compact, structurally superior coupling; and which can be assembled and tightened as readily and in substantially the same manner as the conventional coupling nut.

In the drawing the preferred embodiment of the invention has been illustrated. Obviously various modifications of the invention may become apparent to those skilled in the art upon reviewing the invention herein disclosed. The invention, however, is not to be restricted except in so far as it is necessary in view of the prior art and the spirit of the appended claim.

The invention is hereby claimed as follows:

An article of manufacture comprising a coupling nut having a segmental, internally ribbed end, said coupling nut being adapted for use in the coupling of ferruled ends of pipe sections, said segmental end of said coupling comprising in substance a major segment of a circle and having a pair of opposed flat faces at the ends of the segment of the wall of said nut and a pair of opposed flat faces at the ends of the segment of the internal rib, the ends of said segment of said wall being spaced apart a sufficient distance as to permit the ready lateral insertion of the ferruled end of a pipe section by moving the same laterally through the ends of the segment of said wall, the ends of said internal rib being spaced apart a sufficient distance as to permit the ready lateral insertion of a pipe section carrying an elongated ferruled end by moving the pipe section laterally through the ends of the segmental rib, and inwardly projecting elements at one side of the inner ends of said segmental wall, said projecting elements being spaced apart a distance less than that required for the lateral insertion of the ferruled end of the pipe section but greater than that required for the lateral insertion of the pipe section, whereby after the ferruled end of the pipe section has been laterally inserted through between the ends of the segment of the wall of the coupling nut it may be engaged with said projecting elements to thereby support said coupling nut on the ferruled end of the pipe section.

CHRISTOPHER D. QUINN.

CERTIFICATE OF CORRECTION.

Patent No. 2,286,105.                                       June 9, 1942.

CHRISTOPHER D. QUINN.

It is hereby certified that error appears in the above numbered patent requiring correction as follows: In the grant, lines 2 and 13, and in the heading to the printed specification, line 4, name of assignee, for "Cherry-Burrel" read --Cherry-Burrell--; page 2, second column, line 47, for "segment" read --segmental--; page 3, first column, line 15, after "having" insert --a--; line 25, for "rim 17" read --rib 17--; line 33, for "drawing" read --drawings--; and second column, line 1, for "into" read --onto--; lines 55 and 62, for "couping" read --coupling--; page 4, first column, line 8, in the claim, before the word "comprising" insert --nut--; and that the said Letters Patent should be read with this correction therein that the same may conform to the record of the case in the Patent Office.

Signed and sealed this 22nd day of September, A. D. 1942.

(Seal)                                                       Henry Van Arsdale,
                                                            Acting Commissioner of Patents.